United States Patent [19]
Balch et al.

[11] Patent Number: 5,668,705
[45] Date of Patent: Sep. 16, 1997

[54] WIDE RANGE SINGLE-PHASE/POLYPHASE SWITCHING POWER SUPPLY

[75] Inventors: Richard A. Balch, N. Hampton, N.H.; Raymond B. Ridley, Battle Creek, Mich.; David D. Elmore, Somersworth; Warren R. Germer, Hampton, both of N.H.

[73] Assignee: General Electric Company, New York, N.Y.

[21] Appl. No.: 563,408

[22] Filed: Nov. 30, 1995

[51] Int. Cl.⁶ ............................................. H02M 3/335
[52] U.S. Cl. ........................................................ 363/21
[58] Field of Search ............................................. 363/21

[56] References Cited

U.S. PATENT DOCUMENTS

| | | | |
|---|---|---|---|
| 4,926,307 | 5/1990 | Yang | 363/161 |
| 4,977,368 | 12/1990 | Munday et al. | 324/142 |
| 5,216,357 | 6/1993 | Coppola et al. | 324/142 |
| 5,363,288 | 11/1994 | Castell et al. | 363/21 |
| 5,414,610 | 5/1995 | Brainard | 363/21 |

OTHER PUBLICATIONS

ABB Alpha Meter Technical Specification Jan. 14, 1993.
Motorola Semiconductor Application Note—Motorola, Inc. 1994.

Primary Examiner—Stuart N. Hecker
Attorney, Agent, or Firm—Carl B. Horton; Richard A. Menelly; Hanh T. Pham

[57] ABSTRACT

A wide range single-phase/polyphase switching power supply is presented. The power supply comprises first and second full wave bridge circuits. The rectified outputs of the bridge circuits are connected to a preregulator circuit, i.e., a FET circuit, where the primary input voltage from bridge circuits is limited. The output of the preregulator circuit is presented to a filter circuit. A current mode controller circuit operates at a fixed frequency with a variable duty cycle. An output of the current mode controller circuit drives the gate of a switching FET, at the fixed frequency and variable duty cycle. The aforementioned filtered voltage signal and the drain of the switching FET are connected across a first winding on the primary side of a flyback transformer. A second winding on the primary side of the flyback transformer is connected across Vcc, the supply voltage of the current mode controller circuit. The winding on the secondary side of the flyback transformer is connected to a voltage and filter circuit. Feedback is provided by an opto-isolator from the output voltage back to the compensation input of the current mode controller circuit. A voltage reference $V_{REF}$ is used in the feedback by an error correction amplifier to provide the feedback signal. The power supply of the present invention is particularly well suited for use with electronic electricity meters as such allows a common voltage reference for the power supply and the meter to be used. In a preferred embodiment, the second full wave bridge circuit is carried on a separate circuit board. The attachment of the second bridge circuit board on the main power supply circuit board converts the power supply from a single phase power supply to a polyphase power supply.

24 Claims, 6 Drawing Sheets

WIDE RANGE SINGLE-PHASE/POLYPHASE SWITCHING POWER SUPPLY

BACKGROUND OF THE INVENTION

The present invention relates to power supplies. More specifically, the present invention relates to a wide range single-phase/polyphase switching power supply particularly well suited for use with electronic electricity meters.

Figure 1A:
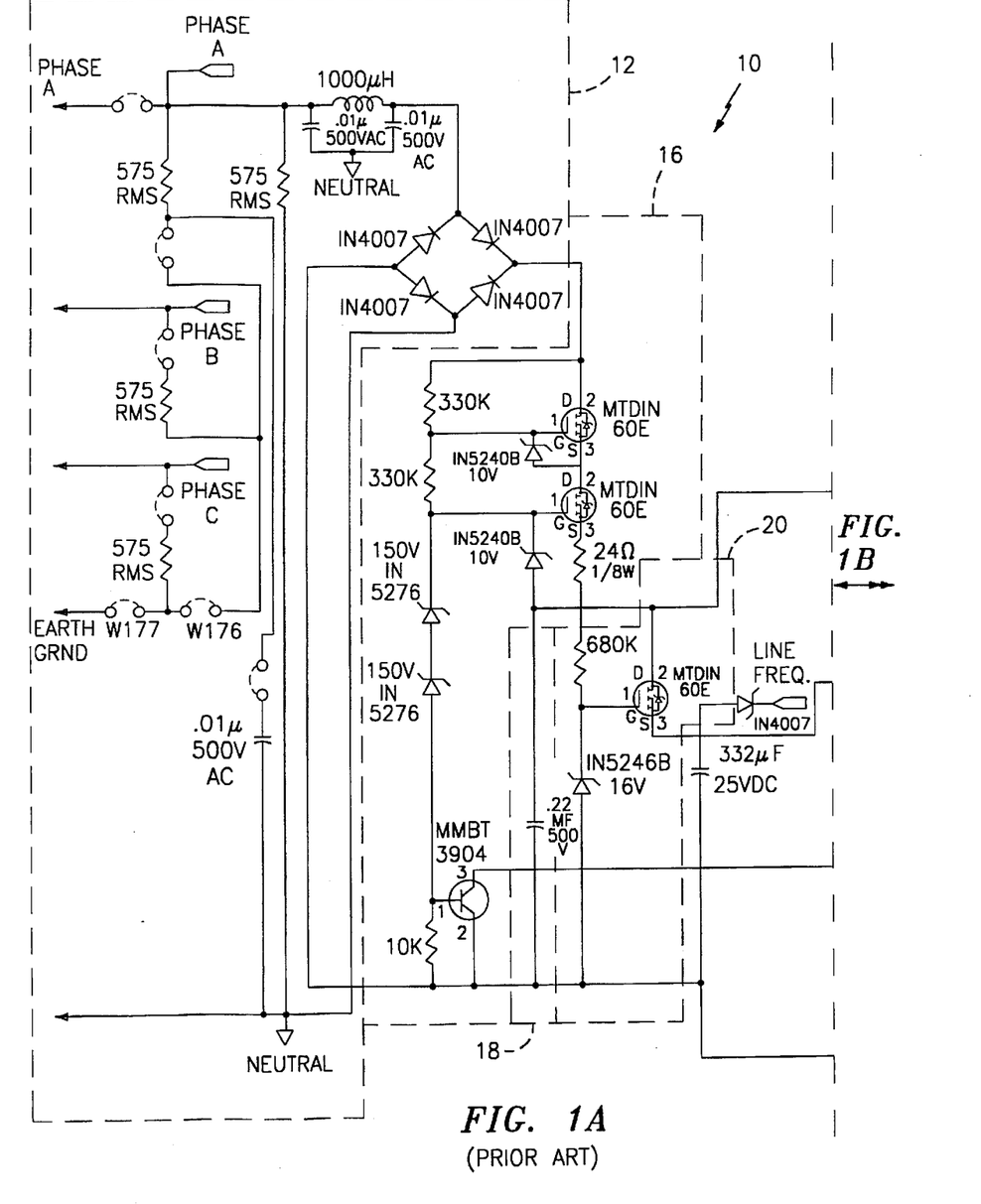
FIGS. 1A and B is a schematic diagram of a power supply circuit in accordance with the prior art.
Figure 1B:
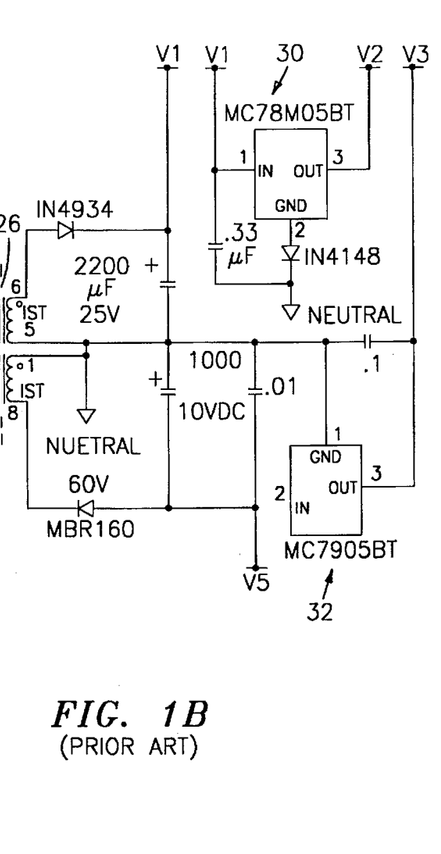

One example of a prior art power supply used with electronic electricity meters is schematically shown in FIGS. 1A and B, herein, labeled prior art. Referring to FIGS. 1A and B, a power supply 10 comprises a full wave bridge circuit 12, which operates on only one phase, and is utilized with both single phase and polyphase meters. The rectified output of bridge circuit 12 is connected to a preregulator circuit 16 where the primary input voltage from bridge circuit 12 is limited to 300 volts, the controller is also cut out at 300 volts. The output of preregulator circuit 16 is presented to a filter circuit 18 comprising a capacitor for supply stability. A bootstrap circuit 20 is connected to a controller circuit 22 for startup. Bootstrap circuit 20 comprises a FET circuit, which starts at a low voltage with low power dissipation at high input voltages.

An output of controller circuit 22 drives the gate of a switching FET 24, at a preset frequency and variable duty cycle. The aforementioned filtered voltage signal and the drain of switching FET 24 are connected across a first winding on the primary side of a flyback transformer 26. The source of switching FET 24 is connected through a resistor to ground. The source of switching FET 24 is also connected to a resistor and capacitor filter/current sense circuit 28 with the output thereof connected to the current sense input of controller circuit 22. A second winding on the primary side of the flyback transformer 26 is connected across Vcc, the supply voltage of the controller circuit 22, and the compensation input of the controller circuit 22 to provide feedback. It will be appreciated that providing feedback directly from the transformer winding in conjunction with the voltage cutout, results in poor rejection of the 120 Hz ripple in the voltage signal, which necessitates regulation of the voltage signal. In accordance with this requirement, the windings on the secondary side of the flyback transformer 26 are connected to positive and negative supply filter and line regulators 30 and 32, respectively.

SUMMARY OF THE INVENTION

The above-discussed and other drawbacks and deficiencies of the prior art are overcome or alleviated by the wide range single-phase/polyphase switching power supply of the present invention.

The power supply comprises first and second full wave bridge circuits. The first bridge circuit is utilized for single phase operation and, the first and second bridge circuits are both utilized for polyphase operation. Accordingly, phase A and neutral are connected to inputs of the first bridge circuit and phases B and C are connected to inputs of the second bridge circuit. The rectified outputs of the bridge circuits are connected to a preregulator circuit, i.e., a FET circuit, where the primary input voltage from bridge circuits is limited. The output of the preregulator circuit is presented to a filter circuit comprising two large capacitors connected in series. A bootstrap circuit is connected to a current mode controller circuit for startup. The bootstrap circuit comprises resistors connected in parallel to the capacitors, which starts at a high voltage with power dissipation increasing as the voltage increases. The resistors are less expensive than the startup FET circuit of the prior art discussed above, however the resistors draw more power at higher voltages and take longer to startup the current mode controller circuit. It is believed that the cost savings out weigh these disadvantages.

The current mode controller circuit operates at a fixed frequency with a variable duty cycle. An output of the current mode controller circuit drives the gate of a switching FET, at the fixed frequency and variable duty cycle. The aforementioned filtered voltage signal and the drain of the switching FET are connected across a first winding on the primary side of a flyback transformer. The source of the switching FET is connected through a resistor to ground. The source of the switching FET is also connected to a resistor and capacitor filter/current sense circuit with the output thereof connected to the current sense input of the current mode controller circuit. A second winding on the primary side of the flyback transformer is connected across Vcc, the supply voltage of the current mode controller circuit. The winding on the secondary side of the flyback transformer is connected to a voltage and filter circuit. The power supply includes a battery backup circuit. Feedback is provided by an opto-isolator from the output back to the compensation input of the current mode controller circuit. Feedback keeps the ripple on the supply voltage low and allows for more precise voltage control. A voltage reference $V_{REF}$ is used in the feedback by an error correction amplifier to provide the secondary feedback signal.

Electricity meters require a voltage reference, as well as a time reference, for measurement of energy delivered to a connected load. The power supply of the present invention is particularly well suited for use with electronic electricity meters. An important feature of the present invention is that a common voltage reference for the power supply and the meter can be used. The use of a common reference, reduces part count and cost.

In a preferred embodiment, the second full wave bridge circuit is carded on a separate circuit board, which is mounted piggy back style on the main power supply circuit board. The circuit boards are electrically interconnected. The attachment of the second bridge circuit board on the main power supply circuit board converts the power supply from a single phase power supply to a polyphase power supply. As discussed above, the power supply of the present invention is well suited for electronic electricity meters, such meters may be single phase meters or polyphase meters. It has been common practice to power the electronics of the meter from only one phase voltage, even with polyphase meters, as discussed hereinabove with regard to the prior art. However, in certain markets it is a requirement that the electronics of the meter be powered from all the phase voltages applied to the meter and that the input voltage supply burden be shared more or less equally by each phase voltage. The polyphase supply can also provide power to the meter from any one phase. Accordingly, for power supplies used with polyphase meters the additional circuit board can be connected to the main power supply circuit board.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 2A:
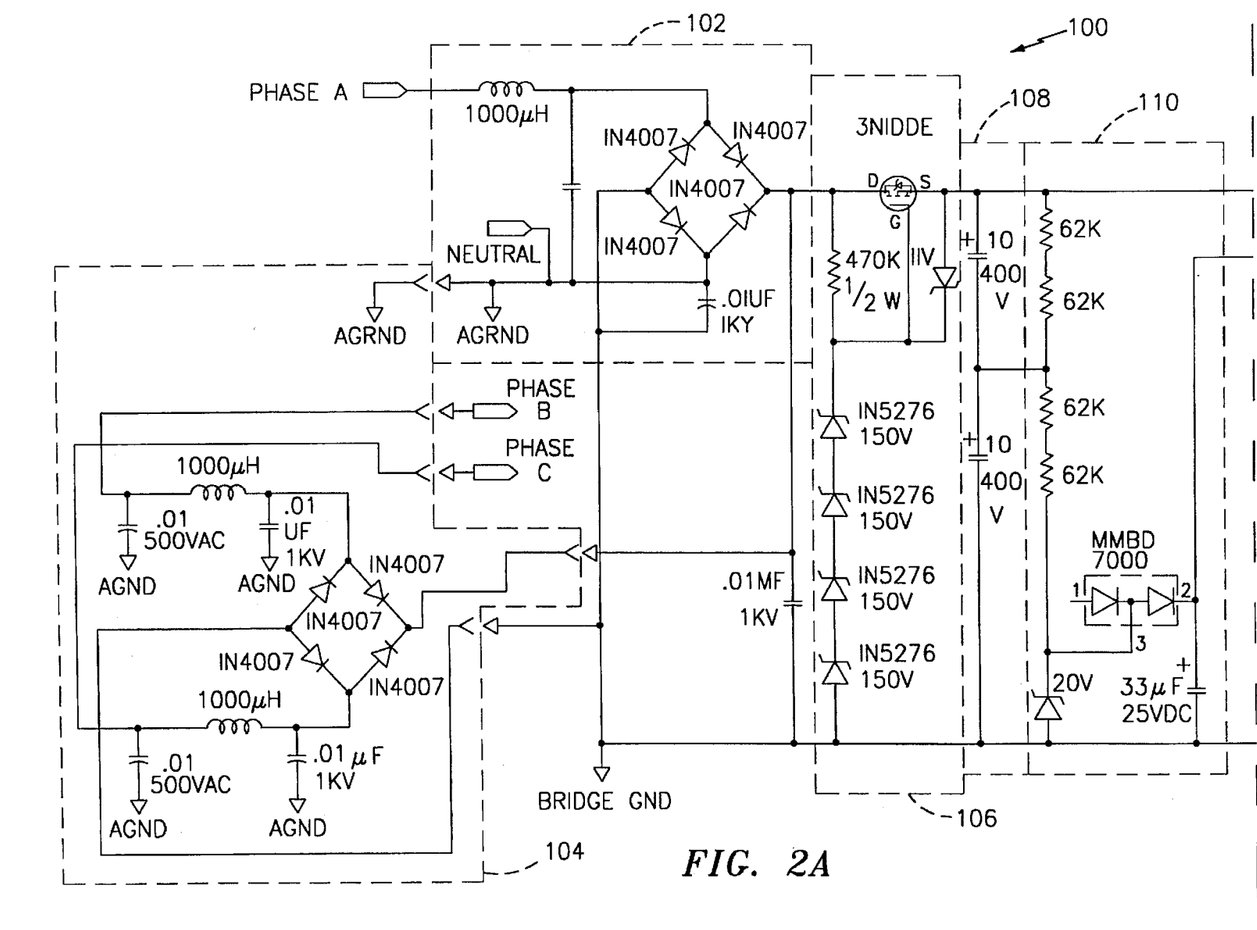
FIGS. 2A–C are a schematic diagram of a power supply circuit in accordance with the present invention.
Figure 2B:
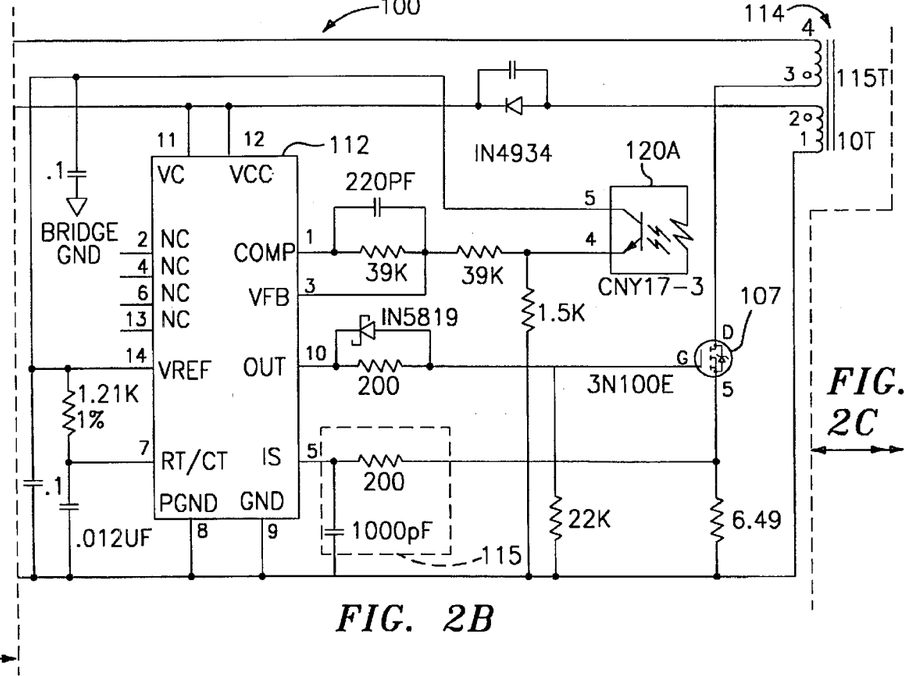
Figure 2C:
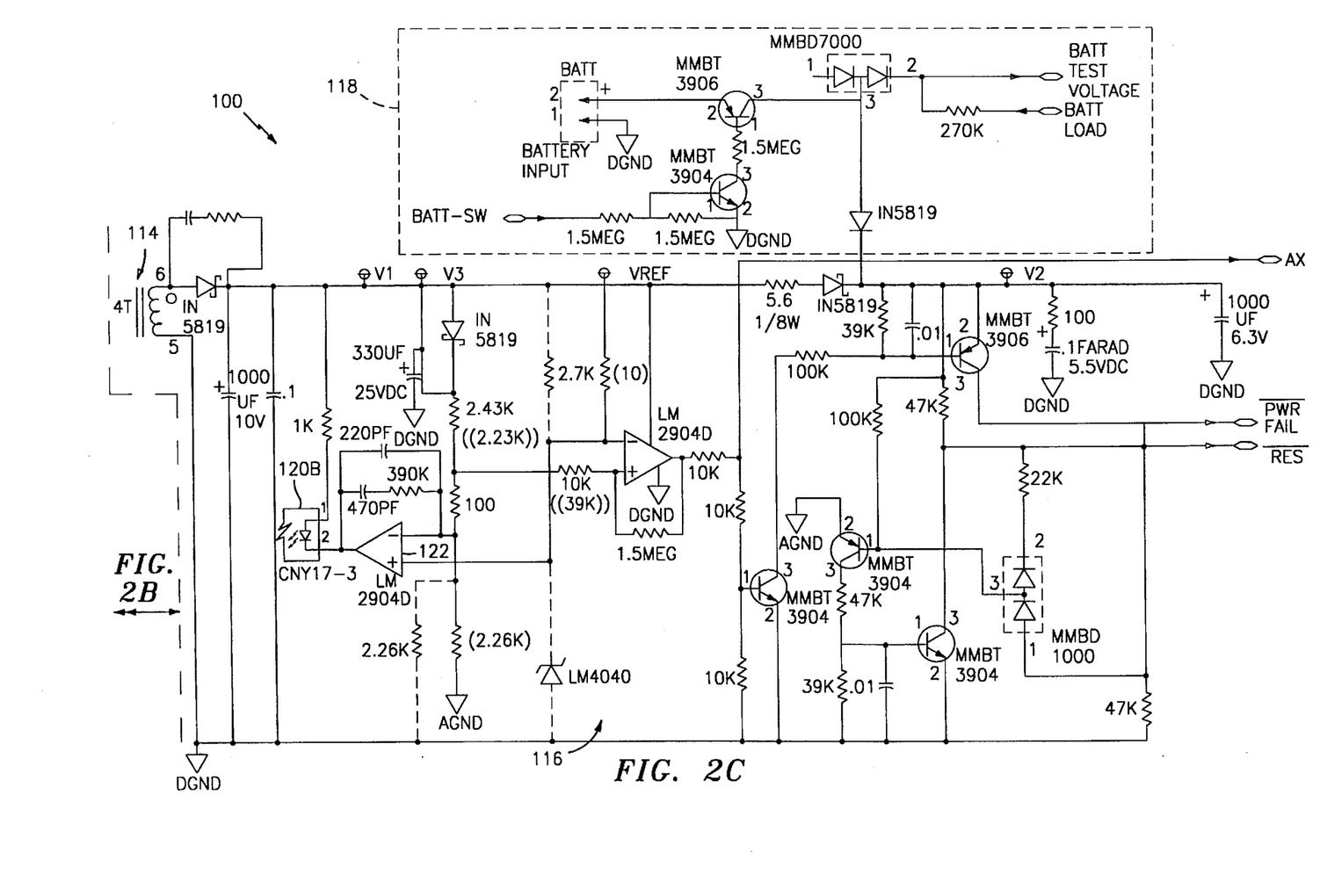

Referring to FIGS. 2A–C, a schematic block diagram of a wide range single-phase/polyphase switching power supply is generally shown at 100. Power supply 100 has a wide range, 120V to 480VAC single phase and 120V to 277V polyphase. Further, power supply 100 has very low 120 Hz ripple and close voltage regulation, as described more fully below.

Power supply 100 comprises first and second full wave bridge circuits 102 and 104, each comprising four diodes. Bridge circuit 102 is utilized for single phase operation and bridge circuits 102 and 104 are both utilized for polyphase operation. Accordingly, phase A and neutral are connected to inputs of bridge circuit 102 and phases B and C are connected to inputs of bridge circuit 104. The rectified outputs of the bridge circuits 102 and 104 are connected to a preregulator circuit 106 where the primary input voltage from bridge circuits 102 and 104 is limited. More specifically, preregulator circuit 106 comprises a FET (field effect transistor) circuit which limits the primary input voltage to, e.g., 600 volts peak. The preregulator circuit 106 improves the integrity of power supply 100 by limiting high voltages which might otherwise damage a switching FET 107, discussed below. The output of preregulator circuit 106 is presented to a filter circuit 108 comprising two large capacitors connected in series. The series connection of the capacitors allows the use of less expensive lower voltage capacitors. A bootstrap circuit 110 is connected to a current mode controller circuit 112 for startup. Bootstrap circuit 110 comprises resistors connected in parallel to the capacitors, which starts at a high voltage with power dissipation increasing at high input voltages. The resistors are also load sharing resistors. The resistors are less expensive than the startup FET circuits commonly employed in the prior art, however the resistors draw more power at higher voltages and take longer to startup current mode controller circuit 112. It is believed that the cost savings out weigh these disadvantages.

Current mode controller circuit 112 operates at a fixed frequency with a variable duty cycle. The duty cycle and frequency being set by selecting appropriate resistor and capacitor connections, as is well known. In the present example, the fixed frequency is 100 Khz and the duty cycle varies from about 20% to about 70%. Current mode controller circuit 112 is commercially available as, for example, part no. UC2842A. An output of current mode controller circuit 112 drives the gate of switching FET 107, at the fixed frequency and variable duty cycle. The aforementioned filtered voltage signal and the drain of switching FET 107 are connected across a first winding on the primary side of a flyback transformer 114. Flyback transformer 114 stores energy within its core during each conduction period. Current mode controller circuit 112 seeks to maintain a constant peak current through the primary winding of transformer 112 over the entire input voltage range, such being obtained by varying the duty cycle, i.e., the on-time of FET 107. The source of switching FET 107 is connected through a resistor to ground. The source of switching FET 107 is also connected to a resistor and capacitor filter/current sense circuit 115 with the output thereof connected to the current sense input of current mode controller circuit 112. A second winding on the primary side of the flyback transformer 114 is connected across Vcc, the supply voltage of the current mode controller circuit 112 to provide power to the controller. The winding on the secondary side of the flyback transformer 114 is connected to a voltage and filter circuit 116.

The supply output voltage V1 from the transformer (i.e., the secondary or output voltage), in the present example, is +5.5 volts dc. The power supply of the present invention includes a battery backup circuit 118. However, it will be appreciated that a battery backup is not required for utilizing the novel power supply features of the present invention. A battery backed output voltage V2 is +5.2 volts dc, which is supplied uninterrupted. V2 supply voltage is +3.3V when supplied by a typical single-cell lithium battery. A switched off (interrupted) at power fail voltage V3 is +5.2 volts dc.

Feedback is provided by opto-isolator 120a and 120b from the output back to the compensation input of the current mode controller circuit 112. The feedback keeps the ripple on the supply voltage low and allows for more precise voltage control. A voltage reference $V_{REF}$ is used in the feedback by an error correction amplifier 122 to provide the secondary feedback signal.

It will be appreciated that the feedback circuitry, in the present example, does not reference the same ground, i.e., AGND, as the rest of the voltage and filter circuit 116, i.e., DGND. The use of these two grounds is exemplary of a particular application of the power supply of the present invention. It will further be appreciated that a common ground could be used, i.e., DGND with the voltage for the power supply being referenced to V1. More specifically, the two resistors and a diode shown in broken lines are added, the two resistors with the values in single parentheses are removed, and the two resistors with a second value shown in double parentheses are changed to that value. The benefits of this exemplary embodiment are described hereinbelow.

Electricity meters require a voltage reference, as well as a time reference, for measurement of energy delivered to a connected load. The power supply of the present invention is particularly well suited for use with electronic electricity meters as such require a regulated dc voltage supply for operation. Further, the power supply of the present invention utilizes a reference voltage, i.e., $V_{REF}$. An important feature of the present invention is that a common voltage reference for the power supply and the meter can be used.

Figure 3:
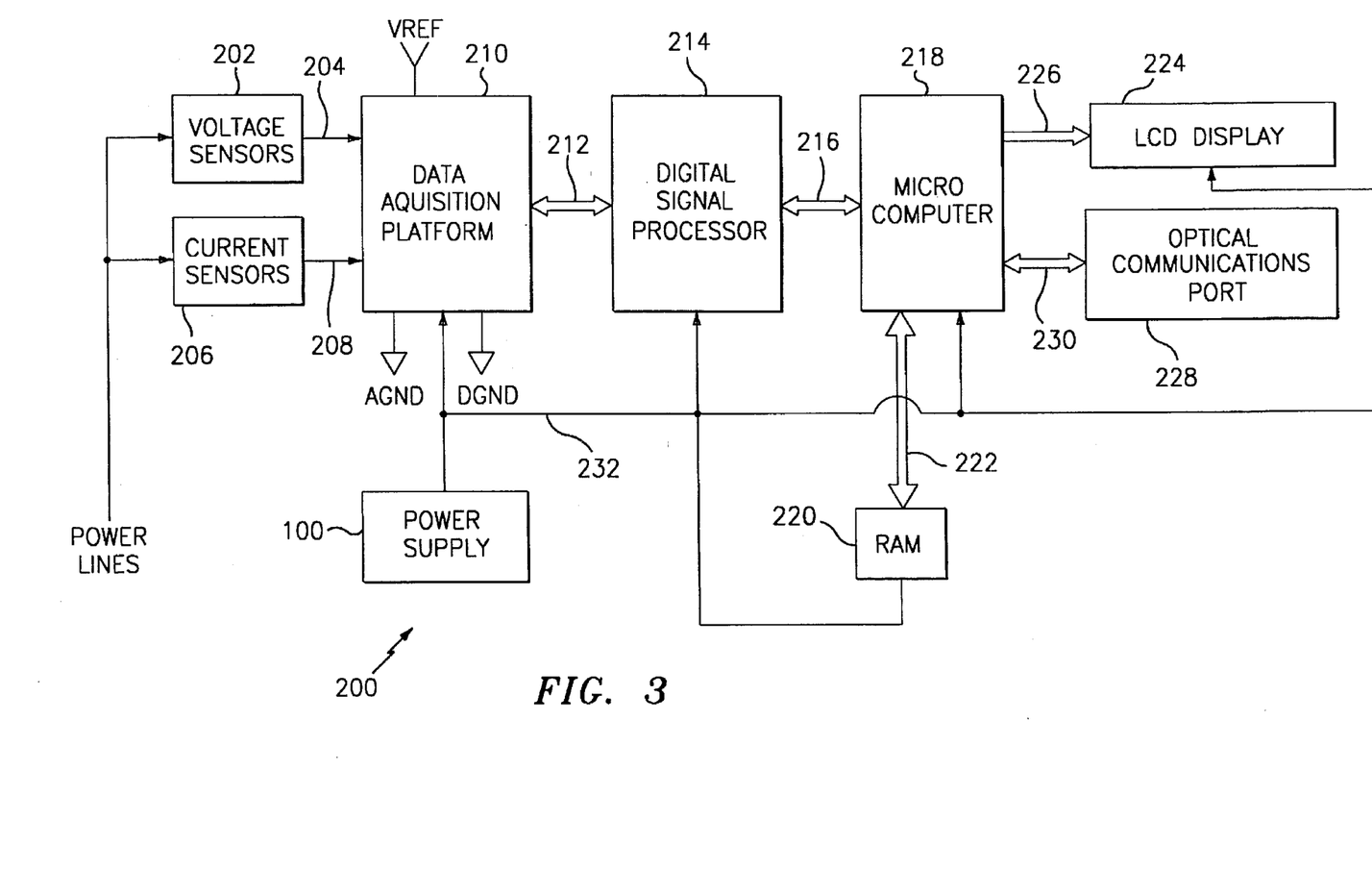
FIG. 3 is a general schematic block diagram of a meter incorporating the power supply of FIGS. 2A and B in accordance with the present invention.

Referring to FIG. 3, a general schematic of an electronic electricity meter is generally shown at 200. Electronic electricity meter 200 comprises a voltage sensor 202 which provides analog signals indicative of voltage measurements on a signal line 204 and a current sensor 206 which provides analog signals indicative of a current measurements on a signal line 208. The analog signals on lines 204 and 208 are presented to a data acquisition platform 210, which converts these analog signals to digital signals. The digital signals are presented over a bus 212 to a digital signal processor 214 where short interval calculations are performed. These calculations are presented over a bus 216 to a microcomputer 218 which is capable of performing demand, TOU (time of use), reactive, KVA and other calculations. Meter 200 further includes RAM (random access memory) 220 which communicates with the microcomputer 218 over a control bus 222. It will be appreciated that the RAM is non-volatile so that system information and programming will not be lost during a power interruption or outage. Data, typically maximum demand, is displayed by a LCD (liquid crystal display) 224 in response to display signals received from microcomputer 218 over a signal line 226. Calibration, testing, programming and other features are accomplished through an optical communications I/O port 228, which communicates with microcomputer 218 over lines 230. Power supply 100 which is powered by the service electricity, as described hereinabove, provides appropriate power over lines 232 to the components of meter 200.

AGND is generated within the data acquisition platform 210 by a resistor divider between DGND and V3. AGND is used as a common connection for ac input signals of the meter. These ac signals vary both above and below AGND.

The error correction amplifier 122 of the power supply has a common-mode input range that nearly spans its supply range, whereby the need does not exist that the supply reference ($V_{REF}$) be connected to DGND. Accordingly, the voltage reference ($V_{REF}$) of the power supply can reference another ground, and since a reference is required for the meter, this reference is used. The use of a common reference, as described above, reduces part count and cost. However, it is recognized that the voltage divider in the meter, in addition to the error correction amplifier 122, contribute to the tolerances and performance of the regulated supply.

Figure 4:
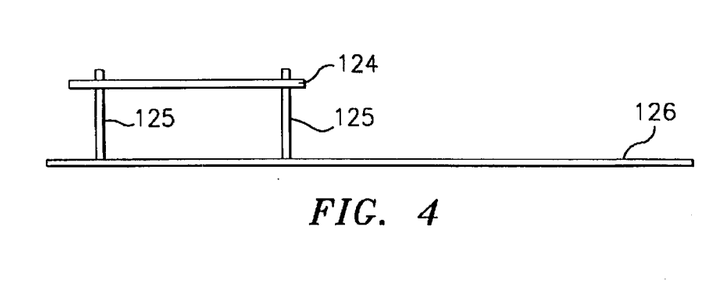
FIG. 4 is a diagrammatic side elevation view of the circuit boards forming the power supply of FIGS. 2A and B in accordance with the present invention.

Referring to FIG. 4, in a preferred embodiment, the second full wave bridge circuit 104 is carded on a circuit board 124 which is itself mounted piggy back style, by a plurality of post 125, on a circuit board 126. Circuit board 126 includes the power supply circuit which carries all of the other components of the power supply circuit described above. The post can serve as a means of electrical interconnection or separate mating connectors connected to the circuit boards can be used, both being well known in the art. The interconnecting post being the preferred embodiment, as the use of such is generally quicker and less expensive than discrete connectors. The post connections, both electrically connect the circuit boards and physically mount circuit board 124 on circuit board 126. The retention force of the post connections keeps the two from coming apart. The attachment of circuit board 124 on circuit board 126 converts the power supply from a single phase power supply to a polyphase power supply.

As discussed above, the power supply of the present invention is well suited for electronic electricity meters, such meters may be single phase meters or polyphase meters. A meter manufacturer will be able to build a single power supply for both of its single phase and polyphase meters and snap on the second full wave bridge circuit board for the polyphase units. This will result in a reduction in inventory of power supplies for a meter manufacturer. It has been common practice to power the electronics of the meter from only one phase voltage, even with polyphase meters. However, in certain markets it is a requirement that the electronics of the meter be powered from all the phase voltages applied to the meter and that the input voltage supply burden be shared more or less equally by each phase voltage. Accordingly, for power supplies used with polyphase meters the additional circuit board can be snapped onto the main power supply circuit board, as described above.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A power supply comprising:

a first bridge circuit receptive to a first phase of a source, said first bridge circuit for generating a rectified signal thereof;

a preregulator circuit for limiting the voltage of said rectified signal, said voltage being substantially over 300 volts, to provide a preregulated signal;

a controller circuit for generating a control signal having a frequency and a duty cycle;

a flyback transformer receptive to said preregulated signal;

a switching circuit for switching said preregulated signal through a first primary winding of said flyback transformer, in response to said control signal, to provide a voltage output signal at a secondary winding of said flyback transformer; and a voltage feedback circuit comprising an opto-isolated feedback circuit, for providing a feedback signal indicative of said output signal to said controller circuit, said control signal being varied, in response to said feedback signal, to compensate for variations in said voltage output signal.

2. The power supply of claim 1 wherein said preregulator circuit comprises a field effect transistor.

3. The power supply of claim 1 wherein said controller circuit comprises a current mode controller circuit with said frequency being fixed and said duty cycle being varied.

4. The power supply of claim 1 wherein said switching circuit comprises a field effect transistor.

5. The power supply of claim 1 further comprising:

a transformer feedback circuit connecting a supply voltage of said controller circuit to a second primary winding of said flyback transformer.

6. The power supply of claim 1 further comprising:

a current sense circuit connected to said switching circuit and said controller circuit for sensing current flow of said preregulated signal through said first primary winding of said flyback transformer.

7. The power supply of claim 1 further comprising:

a battery circuit for providing a battery backup signal for said voltage output signal.

8. The power supply of claim 1 further comprising:

a second bridge circuit receptive to at least one of second and third phases of the source, said second bridge circuit for generating a rectified output thereof, said preregulator circuit for limiting the voltage of combined said rectified signals from said first and second bridge circuits to provide said preregulated signal.

9. The power supply of claim 8 further comprising:

a first circuit board having said first bridge circuit, said preregulator circuit, said controller circuit, said flyback transformer, said switching circuit and said voltage feedback circuit thereon; and a second circuit board having said second bridge circuit thereon, said first and second circuit boards including connections for providing electrical interconnection between said first and second circuit boards, whereby said first and second circuit boards are electrically connected.

10. The power supply of claim 1 further comprising:
a first filter circuit for filtering said preregulated signal.

11. The power supply of claim 10 wherein said first filter circuit comprises:
a pair of series connected capacitors.

12. The power supply of claim 1 further comprising:
a bootstrap circuit connected to said controller circuit for startup thereof.

13. The power supply of claim 12 wherein said bootstrap circuit comprises:
a plurality of series connected resistors.

14. A power supply comprising:
a first circuit board having single phase power supply circuitry thereon; and
a second circuit board having circuitry thereon for converting said single phase power supply circuitry to polyphase power supply circuitry, said first and second circuit boards including connections for providing electrical interconnection between said first and second circuit boards, whereby said first and second circuit boards are electrically connected.

15. The power supply of claim 14 wherein said single phase power supply circuitry comprises:
a first bridge circuit receptive to a first phase of a source, said first bridge circuit for generating a rectified signal thereof;
a preregulator circuit for preregulating said rectified signal to provide a preregulated signal;
a controller circuit for generating a control signal having a frequency and a duty cycle;
a flyback transformer receptive to said preregulated signal;
a switching circuit for switching said preregulated signal through a first primary winding of said flyback transformer, in response to said control signal, to provide a voltage output signal at a secondary winding of said flyback transformer; and
a voltage feedback circuit for providing a feedback signal indicative of said output signal to said controller circuit, said control signal being varied in response to said feedback signal to compensate for variations in said voltage output signal.

16. The power supply of claim 15 wherein said circuitry for converting said single phase power supply circuitry to said polyphase power supply circuitry comprises:
a second bridge circuit receptive to at least one of second and third phases of the source, said second bridge circuit for generating a rectified output thereof, said preregulator circuit for preregulating combined said rectified signals from said first and second bridge circuits to provide said preregulated signal.

17. An electronic electricity meter comprising:
electronic electricity metering circuitry having a voltage and ground reference, said electronic electricity metering circuitry for measuring energy delivered to a connected load; and
a power supply receptive to the energy delivered, said power supply generating voltage signals to power said electronic electricity metering circuitry, said power supply utilizing said voltage and ground reference from said electronic electricity metering circuitry.

18. The electronic electricity meter of claim 17 wherein said electronic electricity metering circuitry includes a data acquisition platform defining said voltage and ground reference.

19. The electronic electricity meter of claim 17 wherein said power supply includes an error correction amplifier utilizing said voltage and ground reference from said electronic electricity metering circuitry.

20. The electronic electricity meter of claim 17 wherein said power supply comprises:
a first bridge circuit receptive to a first phase of the energy delivered, said first bridge circuit for generating a rectified signal thereof;
a preregnlator circuit for preregulating said rectified signal to provide a preregulated signal;
a controller circuit for generating a control signal having a frequency and a duty cycle;
a flyback transformer receptive to said preregulated signal;
a switching circuit for switching said preregulated signal through a first primary winding of said flyback transformer, in response to said control signal, to provide a voltage output signal at a secondary winding of said flyback transformer; and
a voltage feedback circuit for providing a feedback signal indicative of said output signal to said controller circuit, said control signal being varied in response to said feedback signal to compensate for variations in said voltage output signal.

21. The electronic electricity meter of claim 20 wherein said power supply further comprises:
a second bridge circuit receptive to at least one of second and third phases of the energy delivered, said second bridge circuit for generating a rectified output thereof, said preregulator circuit for limiting the voltage of combined said rectified signals from said first and second bridge circuits to provide said preregulated signal.

22. The electronic electricity meter of claim 21 wherein said power supply further comprises:
a first circuit board having said first bridge circuit, said preregulator circuit, said controller circuit, said flyback transformer, said switching circuit and said voltage feedback circuit thereon; and
a second circuit board having said second bridge circuit thereon, said first and second circuit boards including connections for providing electrical interconnection between said first and second circuit boards, whereby said first and second circuit boards are electrically connected.

23. A method for providing a voltage output signal, comprising the steps of:
rectifying a first phase of a source to provide a first rectified signal;
rectifying at least one of second and third phases of the source to provide a second rectified signal thereof;
limiting the voltage of said first and second rectified signal to provide a preregulated signal;
switching said preregulated signal through a first primary winding of a flyback transformer, in response to a control signal having a frequency and a duty cycle, to provide a voltage output signal at a secondary winding of said flyback transformer;
providing a feedback signal indicative of said voltage output signal to said controller circuit; and
varying said control signal in response to said feedback signal to compensate for variations in said voltage output signal.

24. The method of claim 23 wherein said step of varying comprises varying said duty cycle of said control signal.

* * * * *